(12) United States Patent
Hsu et al.

(10) Patent No.: US 9,785,846 B2
(45) Date of Patent: Oct. 10, 2017

(54) METHOD FOR QUANTIFYING CLASSIFICATION CONFIDENCE OF OBSTRUCTIONS

(71) Applicant: Automotive Research & Test Center, Changhua County (TW)

(72) Inventors: Ping-Min Hsu, Changhua County (TW); Ming-Hung Li, Changhua County (TW)

(73) Assignee: AUTOMOTIVE RESEARCH & TEST CENTER, Lugang, Changhua County (TW)

( * ) Notice: Subject to any disclaimer, the term of this patent is extended or adjusted under 35 U.S.C. 154(b) by 187 days.

(21) Appl. No.: 14/757,474

(22) Filed: Dec. 23, 2015

(65) Prior Publication Data
US 2017/0185850 A1    Jun. 29, 2017

(51) Int. Cl.
*G06F 17/10* (2006.01)
*G06K 9/00* (2006.01)
(Continued)

(52) U.S. Cl.
CPC ......... *G06K 9/00805* (2013.01); *B60W 30/09* (2013.01); *B60W 50/14* (2013.01); *G05D 1/024* (2013.01)

(58) Field of Classification Search
CPC .. G06K 9/00805; B60W 30/09; B60W 50/14; G05D 1/024
(Continued)

(56) References Cited

U.S. PATENT DOCUMENTS

| 5,865,265 A * | 2/1999 | Matsumoto | G01S 13/931 180/169 |
| 2015/0130937 A1* | 5/2015 | Graumann | G08G 1/165 348/148 |

OTHER PUBLICATIONS

Michael Aeberhard et al, "Track-to Track Fusion With Asynchronous Sensors Using Information Matrix Fusion for Surround Environment Perception," in IEEE Transactions on intelligent transportation systems, vol. 13, No. 4, Dec. 2012. pp. 1717-1726.
(Continued)

*Primary Examiner* — Gertrude Arthur Jeanglaude
(74) *Attorney, Agent, or Firm* — Muncy, Geissler, Olds & Lowe, P.C.

(57) ABSTRACT

A method for quantifying classification confidence of obstructions applied to a perception mergence system of a vehicular computer in a vehicle. The method includes steps of: the vehicular computer receiving obstruction information of at least obstruction, image information corresponding to the obstruction information and vehicle body signals, and using a classifier to classify them; calculating a detection result of each range sensor to calculate a existence confidence; using the existence confidences and precision of the classifier to calculate a classification belief assignment of each range sensor corresponding to each obstruction; performing mergence calculation on the classification belief assignments to respectively quantify an obstruction classification confidence of all the range sensor corresponding to each obstruction; and performing a classification ineffectiveness filtering mechanism to exclude the obstruction whose obstruction classification confidence less than a predetermined value. The present invention quantifies the obstruction classification confidence to improve the classification precision.

14 Claims, 7 Drawing Sheets

(51) Int. Cl.
*B60W 30/09* (2012.01)
*B60W 50/14* (2012.01)
*G05D 1/02* (2006.01)

(58) Field of Classification Search
USPC .................. 701/31.4, 34.3, 36, 301; 340/901
See application file for complete search history.

(56) References Cited

OTHER PUBLICATIONS

Michael Aeberhard, Sascha Paul, Nico kaempchen, and Torsten Bertram, "Object Existence Probability Fusion using Dempster-Shafer Theory in a High-Level Sensor Data Fusion Architecture," in 2011 IEEE Intelligent Vehicles Symposium (IV) Baden-Baden, Germany, Jun. 5-9, 2011, pp. 770-775.

\* cited by examiner

METHOD FOR QUANTIFYING CLASSIFICATION CONFIDENCE OF OBSTRUCTIONS

BACKGROUND OF THE INVENTION

Field of the Invention

The present invention relates to a method for quantifying classification confidence of objects, particularly to a method for quantifying classification confidence of obstructions applied to a perception mergence system.

Description of the Related Art

Presently, functions of vehicular computers become more and more perfect. In order to improve driving safety and consider the future of autonomous driving, the detection of obstructions in front of a vehicle and the confidence of classifying the obstructions are of importance. The obstructions are classified into different classifications, including vehicles, pedestrians, bicycles and utility poles. According to the system setting, classification items are decided. In this way, the system provides braking suggestion, automatically brakes quickly, or performs other activities according to the obstructions' classification.

FIG. 1 is a block diagram showing detection for obstructions in front of a vehicle and perception mergence in the traditional technology. A camera 10 retrieves a front road image, and a plurality of sensors 11 and 12 detect distances between themselves and front obstructions, or retrieve a vehicle body signal of the vehicle. The heights and profiles of the obstructions are obtained from the distance detected by the sensors 11 and 12. Then, the front road image, the obstruction information and the vehicle body signal are used to respectively analyzing the obstruction information 13 and to calculate mergence information for positions and classification 15 of the obstructions. Besides, the front road image, the obstruction information and the vehicle body signal are used to respectively estimating existence confidences 14, namely precision that the front obstructions exist. Also, the existence confidences merged 16. Finally, outputting information 17, and the information includes the probabilities that the obstructions indeed exist, coordinates and possible classification of the obstructions. However, there is no mechanism to determine whether the existence confidences calculated by the system are correct again. Thus, the mergence results of the existence confidences are directly trusted. The existence confidences directly trusted will lead to serious results if misjudgment occurs, Take a real case for example. As shown in FIG. 2, a vehicle 18a is provided with a vehicular computer having a system for front obstruction detection and classification warning. The vehicle 18a is a safe distance from a front vehicle 18b. A large tanker 18c drives on a right lane. When the tanker 18c passes by the vehicle 18a, the microwaves reflected from the front vehicle 18b are diffused by the tanker 18c. The system of the vehicle 18a receives the microwaves diffused to determine that the probability of hitting a front vehicle is very high, and then automatically brakes quickly. As a result, a rear vehicle 18d hits the vehicle 18a before reacting. In fact, there is no vehicle driving near the vehicle 18a and in front of the vehicle 18a. Instead, the tanker 18c drives on the right lane neighboring the vehicle 18a. The system misjudges that the noise represents a vehicle, which results in incorrect brake.

Accordingly, how to improve the precision of existence confidences and classification confidences and the reference for quantifying the mergence information to avoid misjudgment is an important problem. The present invention provides a method for quantifying classification confidence of obstructions and describes specific architectures and embodiments as followings:

SUMMARY OF THE INVENTION

A primary objective of the present invention is to provide a method for quantifying classification confidence of obstructions, which quantifies the confidence for classification information of obstructions to improve classification precision, lest an active safe system at a rear end do mistaken action to result in malfunction due to using incorrect information.

Another objective of the present invention is to provide a method for quantifying classification confidence of obstructions, which merges the information retrieved by range sensors, an image-retrieving unit and a vehicle body signal sensor to obtain information for position, classification and classification belief assignments of each obstruction corresponding to all the sensors.

Further objective of the present invention is to provide a method for quantifying classification confidence of obstructions, which further comprises a classification ineffectiveness filtering mechanism. When the quantified classification confidence of the obstruction is less than a predetermined value, which represents a classification error, the obstruction is ignored. When the classification confidence of the obstruction is larger than or equals to the predetermined value, the system informs a driver. In this case, the autonomous driving system can automatically brake.

To achieve the abovementioned objectives, the present invention provides a method for quantifying classification confidence of obstructions applied to a perception mergence system of a vehicular computer in a vehicle, and the vehicular computer is connected with an image-retrieving unit, a vehicle body signal sensor and a plurality of range sensors. The method comprises steps of: the vehicular computer receiving obstruction information of at least one obstruction, at least one piece of image information corresponding to the obstruction information and a plurality of vehicle body signals, and using a classifier to classify the obstruction information, the image information and the vehicle body signals; the perception mergence system calculating a detection result of each range sensor to calculate a existence confidence; using the existence confidences and precision of the classifier to calculate a classification belief assignment of each range sensor corresponding to each obstruction; performing mergence calculation on the classification belief assignments to respectively quantify an obstruction classification confidence of all the range sensors corresponding to each obstruction; and performing a classification ineffectiveness filtering mechanism according to the obstruction classification confidence to exclude the obstruction whose obstruction classification confidence less than a predetermined value.

Wherein, the existence confidence is a probability that the obstruction detected by the range sensor is an entity. Each range sensor tracks coordinates of the obstruction presently detected, compares with an actual value and a plurality of tracking values subsequently-received to determine a probability that the tracked obstruction presently exists whereby the probability is used as the existence confidence, wherein the tracking and comparison of the obstruction and determination of the existence confidence are calculated using joint integrated probabilistic association (JIPDA).

In the present invention, the mergence calculation uses the classification belief assignments, precision of the range sensors and at least one obstruction continuous detection probability to calculate the obstruction classification confidence, wherein the obstruction continuous detection probability is a probability that the range sensors continuously detect identical the obstruction.

Suppose that no image is used to determine classification of the obstructions. For example, only detection information for radars is used to determine classification of the obstructions. Thus, a determination way of the obstruction continuous detection probability comprises steps of: receiving the obstruction information detected by the range sensor to determine whether the obstruction is a vehicle; and comparing with the preceding obstruction information to determine whether the obstructions corresponding to the preceding obstruction information and the received obstruction information are identical: if no, determining that the obstruction is not a vehicle; and if yes, determining whether the identical obstruction is continuously detected more than predetermined times: if yes, determining the obstruction is a vehicle; and if no, determining the obstruction is not a vehicle.

The vehicular computer informs a driver of the vehicle of the obstruction information of the obstruction in front of the driver in hearing, touch or vision ways when the obstruction classification confidence is larger than or equals to the predetermined value. In this case, the vehicular computer informs the driver of a probability of the obstruction being a vehicle or a pedestrian. Meanwhile, the perception mergence system returns to the preceding step and retrieves another obstruction classification confidence to determine whether it less then the predetermined value.

The classification ineffectiveness filtering mechanism of the present invention comprises steps of: retrieving the obstruction classification confidence of one obstruction; and determining whether the retrieved obstruction classification confidence is less than the predetermined value: if yes, classifying the obstruction into misjudgment and filtering it out; and if no, retrieving the obstruction classification confidence of another obstruction for determining again.

The mergence calculation of the present invention comprises steps of: choosing a specific obstruction from the at least one obstruction and introducing the classification belief assignments of the range sensors detecting the specific obstruction, the precision of the range sensors and the obstruction continuous detection probability; calculating basic belief assignments of the range sensors according to existence or inexistence of the specific obstruction; the specific obstruction having four detection situations comprising null, existence, inexistence, possible existence, and possible inexistence and using the basic belief assignments of the range sensors to calculate a mergence belief assignment according to the four detection situations; and calculating an object existence probability of the specific obstruction according to the mergence belief assignment.

Below, the embodiments are described in detail in cooperation with the drawings to make easily understood the technical contents, characteristics and accomplishments of the present invention.

DETAILED DESCRIPTION OF THE INVENTION

The present invention provides a method for quantifying classification confidence of obstructions. When each sensor detects obstructions in front of itself, the present invention tracks position information of the obstructions, quantifies a existence confidence of each sensor, and merges with a classification belief assignment of each sensor to quantify an obstruction classification confidence, which is provided to the system for classifying and filtering errors, so as to improve reliability and precision of overall classification.

Figure 1:
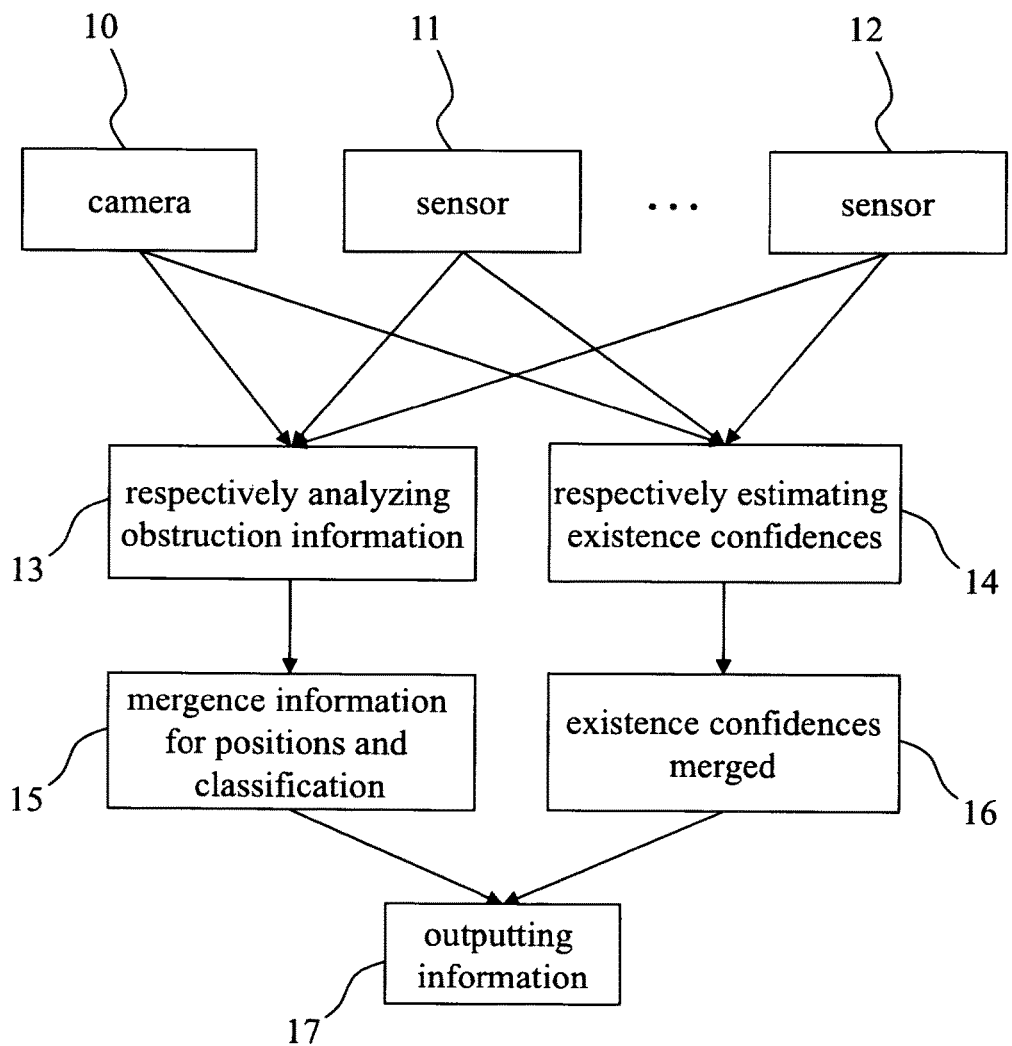
FIG. 1 is a block diagram showing detection for obstructions in front of a vehicle and perception mergence in the traditional technology.
Figure 2:
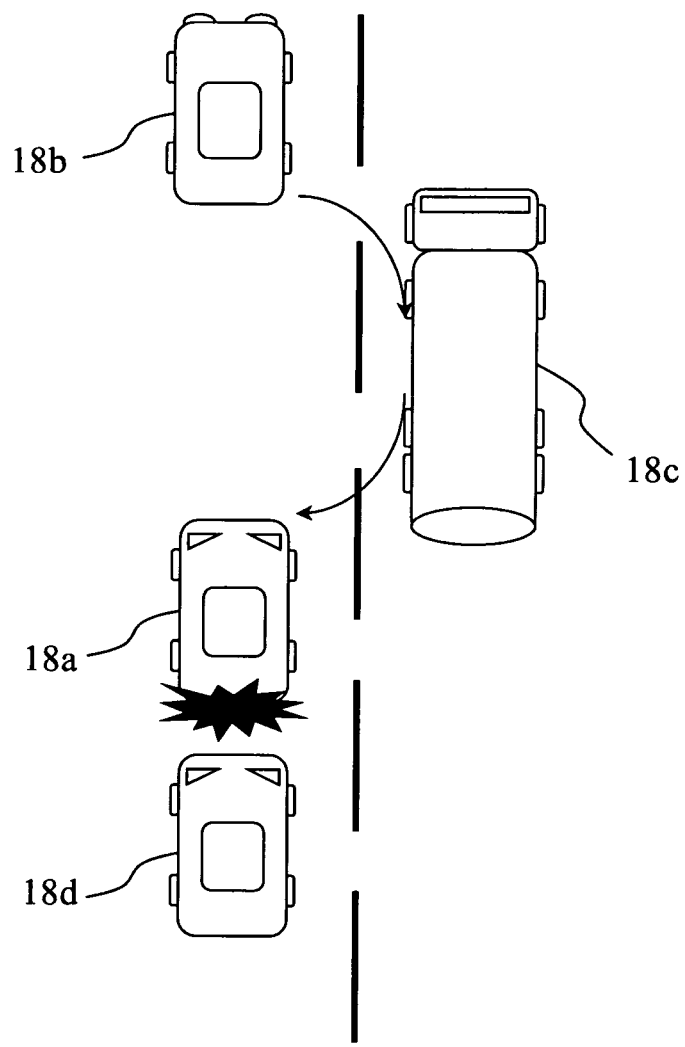
FIG. 2 is a diagram schematically showing misjudgment in the traditional technology.
Figure 3:
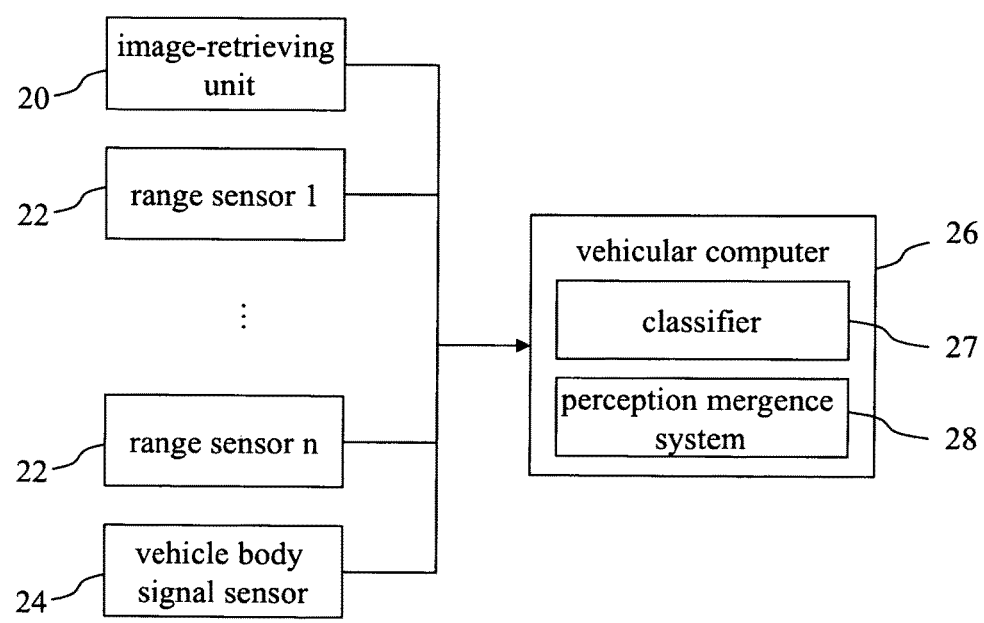
FIG. 3 is a diagram schematically showing a system of using a method for quantifying classification confidence of obstructions according to an embodiment of the present invention.

FIG. 3 is a diagram schematically showing a system of using a method for quantifying classification confidence of obstructions according to an embodiment of the present invention. A vehicular computer 26 in a vehicle comprises a classifier 27 and a perception mergence system 28, and the vehicular computer 26 is connected with an image-retrieving unit 20, a vehicle body signal sensor 24 and a plurality of range sensors 22. The range sensors 22 are radars or lidars (laser radars) and obtain obstruction information of at least one obstruction in front of the vehicle. The image-retrieving unit 20 retrieves at least one piece of image information corresponding to the obstruction information. The vehicle body signal sensor 24 obtains a plurality of vehicle body signals, including those of vehicle speed or a rotational angle of a steering wheel.

Figure 4:
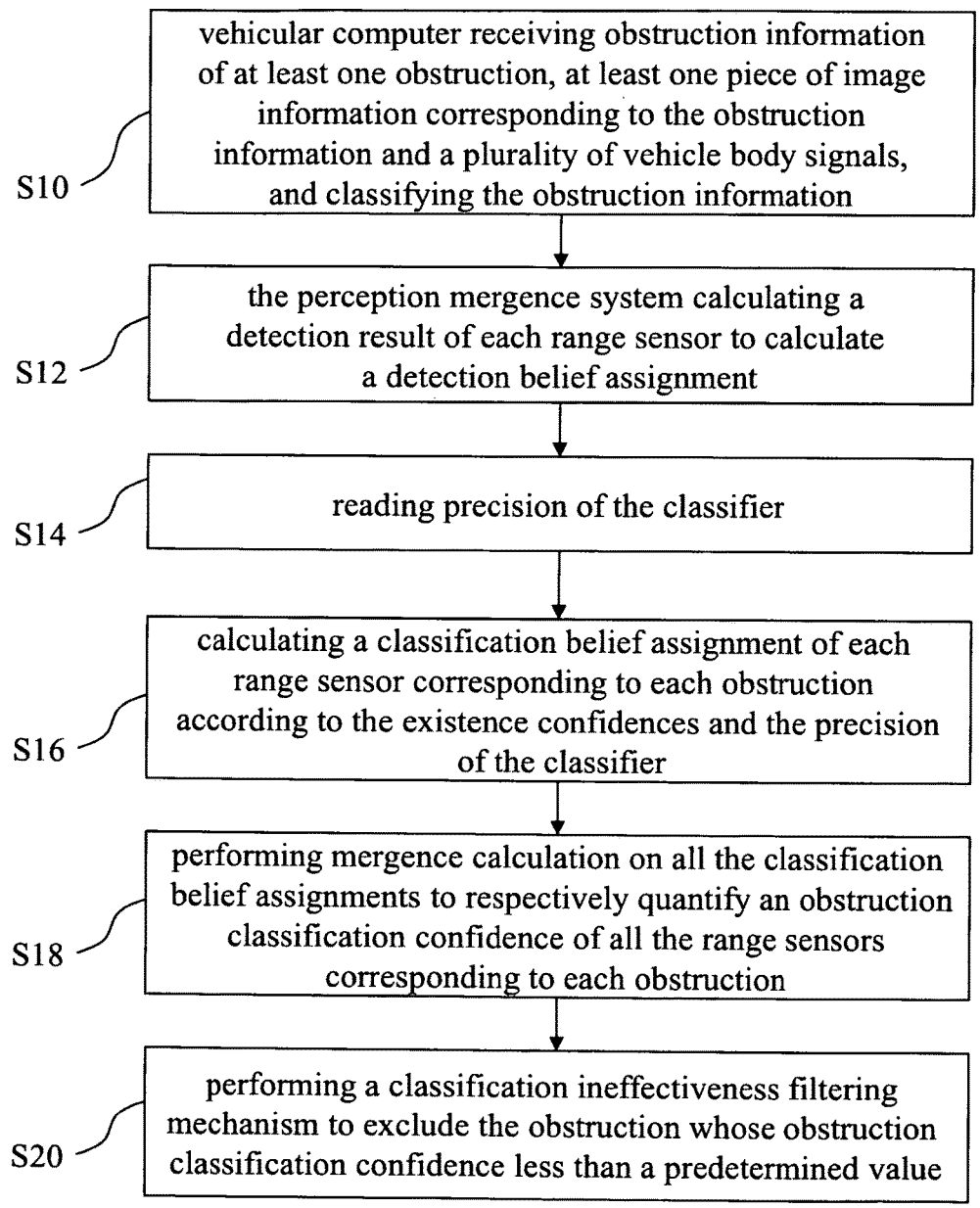
FIG. 4 is a flow chart showing a method for quantifying classification confidence of obstructions according to an embodiment of the present invention.

FIG. 4 is a flow chart showing a method for quantifying classification confidence of obstructions according to an embodiment of the present invention. In Step S10, the vehicular computer receives obstruction information of at least one obstruction, at least one piece of image information corresponding to the obstruction information and a plurality of vehicle body signals, and a classifier is used to classify the obstruction information, the image information and the vehicle body signals. The classifier is a function module in the vehicular computer. Then, in Step S12, the perception mergence system calculates a detection result of each range sensor to calculate a existence confidence, wherein the existence confidence is a probability that the obstruction detected by the range sensor is an entity. Each range sensor obtains the existence confidence corresponding to the obstruction. If a plurality of obstructions is detected, each range sensor obtains a plurality of existence confidences corresponding to the obstructions. In the present invention, each range sensor tracks coordinates of the obstruction presently detected, namely position information of the obstruction. Besides, each range sensor compares with an actual value and a plurality of tracking values subsequently-received to determine a probability that the tracked obstruction presently exists whereby the probability is viewed as the existence confidence. The tracking and comparison of the obstruction and determination of the existence confidence are calculated using joint integrated probabilistic association (JIPDA).

Then, in Step S14, precision of the classifier is read, wherein the precision is set by a developer of the classifier.

Then, in Step S16, the existence confidences and the precision of the classifier read in the preceding step are used to calculate a classification belief assignment of each range sensor corresponding to each obstruction. The classification belief assignment of each classifier equals to the existence confidence multiplied by the precision of the classifier.

Figure 5:
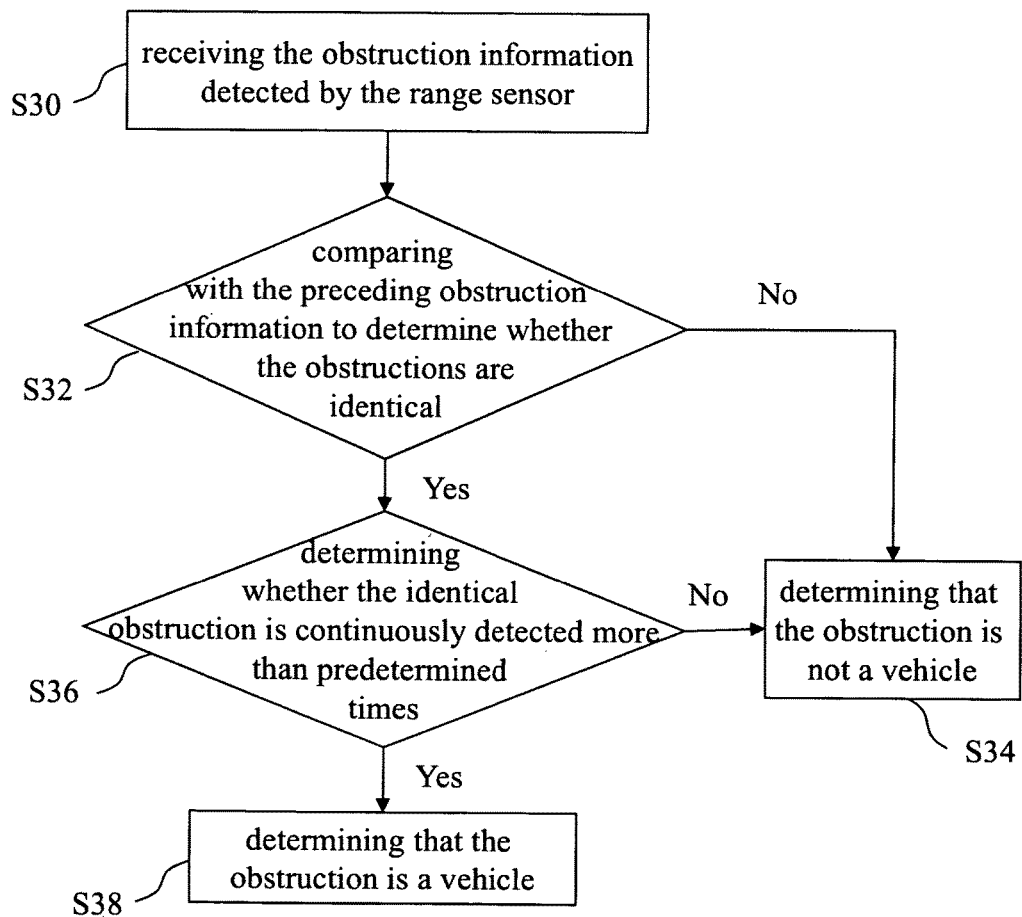
FIG. 5 is a flow chart determining an obstruction continuous detection probability according to an embodiment of the present invention.

Then, in Step S18, mergence calculation is performed on all the classification belief assignments to respectively quantify an obstruction classification confidence of all the range sensors corresponding to each obstruction. In the step, the perception mergence system firstly defines detection situations of each obstruction, including those of four situations $\{\phi, \{\exists\}, \{\nexists\}, \{\exists,\nexists\}\}$. $\phi$ denotes null, and $\{\exists\}$ denotes existence of the obstruction, and $\{\nexists\}$ denotes inexistence of the obstruction, and $\{\exists,\nexists\}$ denotes possible existence or possible inexistence of the obstruction. Meanwhile, three parameters are required to calculate an obstruction classification confidence of a specific obstruction. The three parameters include the classification belief assignment of each range sensor corresponding to the specific obstruction, precision of the range sensors and at least one obstruction continuous detection probability. The precision of the range sensors is provided by an industry in a factory. Not all precision of the range sensors are identical. In general, the precision of the range sensors is impossible to reach 100%. If the precision, for example, is lowered and different from an initial value thereof, the precision can be manually adjusted. As a result, the precision of each range sensor is a predetermined value in advance, and the obstruction continuous detection probability is a probability that the range sensors continuously detect the identical obstruction. If the vehicle is provided with the image-retrieving unit 20, the images are used to directly determine whether the obstruction is a vehicle and the range sensors are responsible for auxiliary determination. If the vehicle does not be provided with the image-retrieving unit 20 to retrieve the images, only the range sensors are used to determine whether the obstruction is a vehicle. In such a case, a determination way of the obstruction continuous detection probability is shown in FIG. 5. Firstly, in Step S30, the obstruction information detected by the range sensor is received to determine whether the obstruction is a vehicle. Then, in Step S32, the preceding obstruction information is compared with the received obstruction information to determine whether the obstructions corresponding to the preceding obstruction information and the received obstruction information are identical. If the answer is no, the process determines that the obstruction is not a vehicle, as shown in Step S34. If the answer is yes, the process determines whether the identical obstruction is continuously detected more than predetermined times, as shown in Step S36. If the answer is yes, the process determines the obstruction is a vehicle, as shown in Step S38. If the answer is no, the process determines that the obstruction is not a vehicle, as shown in Step S34.

Figure 6:
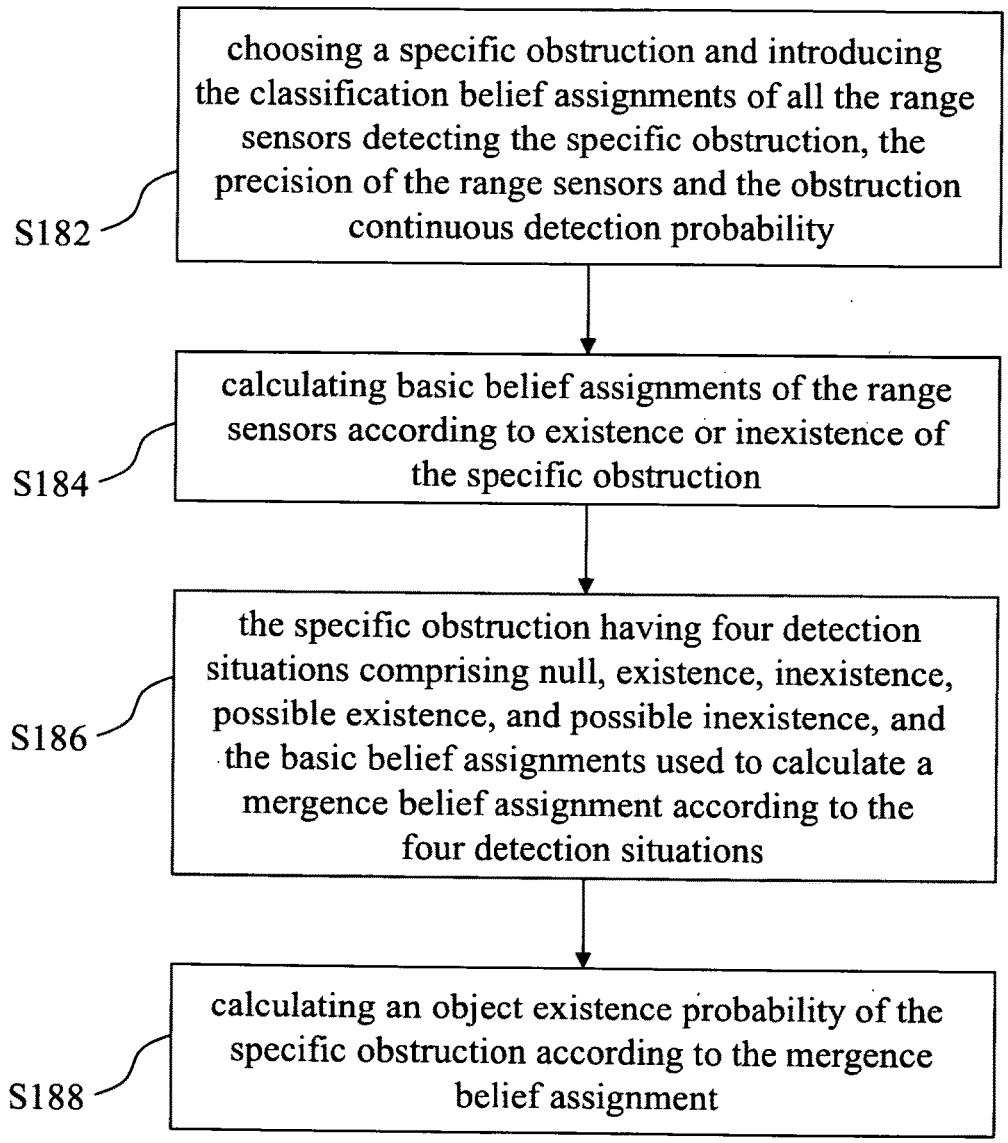
FIG. 6 is a flow chart showing mergence calculation according to an embodiment of the present invention.

In Step S18, the mergence calculation merges with all the information of the specific obstruction using Dempster-Shafer theory. Refer to FIG. 6, which is a flow chart showing the mergence calculation. Firstly, in Step S182, the classification belief assignments of all the range sensors detecting the specific obstruction, the precision of the range sensors and the obstruction continuous detection probability are introduced. Then, in Step S184, basic belief assignments of the range sensors according to existence or inexistence of the specific obstruction are calculated. Then, in Step S186, the specific obstruction has four detection situations comprising null, existence, inexistence, possible existence, and possible inexistence, and the basic belief assignments of Step S184 is used to calculate a mergence confidence assignment according to the four detection situations. Finally, in Step S188, an object existence probability of the specific obstruction is calculated according to the mergence belief assignment, and the object existence probability is the obstruction classification confidence of the present invention.

The formulas of the mergence calculation are described as followings:

Firstly, in Step S182, the classification belief assignment $p^i(\exists x)$ of each range sensor corresponding to the obstruction, the precision $p_{trust}^i$ of the range sensors and the obstruction continuous detection probability $p_p^i(x)$ are introduced. Then, in Step S184, the basic belief assignment of each range sensor is calculated, as shown by formulas (1) and (2).

$$m_i(\{\exists\}) = p_p^i(x) \cdot p_{trust}^i \cdot p^i(\exists x) \qquad (1)$$

$$m_i(\{\nexists\}) = p_p^i(x) \cdot p_{trust}^i \cdot [1 - p^i(\exists x)] \qquad (2)$$

$m_i(\{\exists\})$ is the basic belief assignment during existence of the obstruction, and $m_i(\{\nexists\})$ is the basic belief assignment during inexistence of the obstruction. In the embodiment, existence $\{\exists\}$ and inexistence $\{\nexists\}$ of the obstruction are adopted without considering null $\phi$, and possible existence and possible inexistence $\{\exists,\nexists\}$ of the obstruction.

Then, in Step S186, the mergence belief assignment is calculated only using $\{\exists\}$ and $\{\nexists\}$, as shown by formula (3). Wherein, $A=\{\exists\}$, $B=\{\nexists\}$.

$$m_F(\{\exists\}) = \frac{\sum_{A \cap B = \exists} m_i(A) m_j(B)}{1 - \sum_{A \cap B = \emptyset} m_i(A) m_j(B)} = \frac{a+b+c}{1 - [m_i(\{\exists\}) m_j(\{\nexists\}) + m_i(\{\nexists\}) m_j(\{\exists\})]} \qquad (3)$$

Finally, in Step S188, an object existence probability of the specific obstruction is calculated according to the mergence belief assignment, as shown by formula (4).

$$p_F(\exists x) = \frac{Bel_F(\{\exists\}) + Pl_F(\{\exists\})}{2} \qquad (4)$$

$Bel_F(\{\exists\})$ is a situation without considering not determining existence or inexistence of the obstruction, and $Pl_F(\{\exists\})$ is a situation with considering not determining existence or inexistence of the obstruction. Formula (4) represents that the existence probabilities are weighted to obtain the average of various situations as the object existence probability of the obstruction, namely the obstruction classification confidence.

Figure 7:
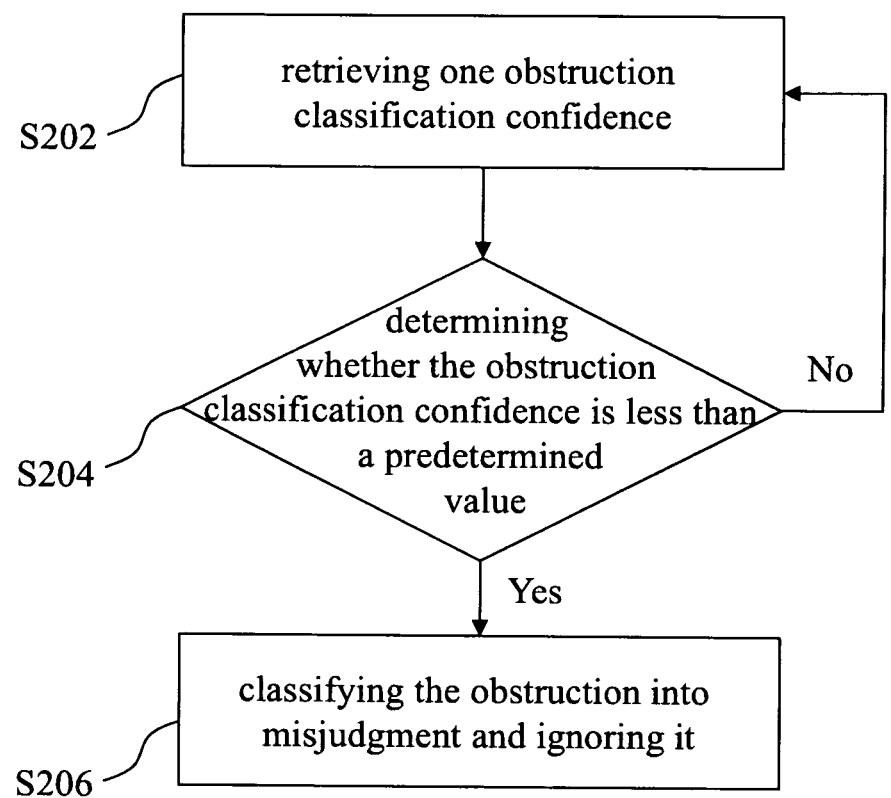
FIG. 7 is a flow chart showing a classification ineffectiveness filtering mechanism according to an embodiment of the present invention.

In FIG. 4, the final step is Step S20. In Step S20, a classification ineffectiveness filtering mechanism is performed according to the obstruction classification confidence. When the obstruction classification confidence is less than a predetermined value, the detection or classification of the obstruction is not reliable. In such a case, the perception mergence system excludes the obstruction, and the process is specifically shown in FIG. 7. Refer to FIG. 7. In Step S202, the obstruction classification confidence of one obstruction is retrieved, wherein the obstruction classification confidence is obtained from merging all the range sensors. Then, in Step S204, the process determines whether the retrieved obstruction classification confidence is less than the predetermined value. If the answer is yes, the process classifies the obstruction into misjudgment and filters it out, as shown in Step S206. If the answer is no, the process returns to Step S202 and retrieves the obstruction classification confidence of another obstruction for determining again until the classification ineffectiveness filtering mechanism is performed on all the obstructions detected in front of the vehicle. In Step S202, the vehicular computer informs a driver of the vehicle of the obstruction information of the obstruction in front of the driver in hearing, touch or vision ways. Besides, the vehicular computer informs the driver of a probability of the obstruction being a vehicle or a pedestrian. In this case, the autonomous driving system can automatically brake.

In Step S204, the predetermined value of the obstruction classification confidence is adjusted by the driver. For example, if the driver starts a semi-autonomous driving system, the predetermined value should be increased to above 70% lest most obstructions be determined as vehicles so that the vehicular computer controls the semi-autonomous driving system to endlessly brake quickly when the predetermined value is decreased. When the driver drives the vehicle by himself and the obstruction classification confidence is used as auxiliary reference, the predetermined value, for example, is decreased to 30-50%. In this way, the driver himself can determine whether to slow down or brake although the perception mergence system usually sends notices such as the front obstructions being vehicles, slowing down or braking.

For example, suppose that the range sensor is a radar. The existence confidence of the range sensor is 0.9999, and the precision of the classifier is 0.87, and the classification belief assignment of the range sensor is 0.9999*0.87=0.8699. The existence confidence of the image-retrieving unit is 0.94, and the precision of the classifier is 0.95, and the classification belief assignment of the image-retrieving unit is 0.94*0.95=0.895. The obstruction classification confidence is 0.895 after the mergence calculation. The present invention retrieves an obstruction classification confidence to determine whether it is larger than a predetermined value such as 0.6. Due to 0.895 larger than 0.6, the present invention determines that the obstruction is a vehicle and informs the obstruction information of the driver.

The traditional technology obtains the classification and existence confidences of the obstructions, and then activates the system. However, the traditional technology does not check how high the classification confidence again. The classification is ineffective, which misjudges that the noise represents a vehicle and incorrectly activates a safe mechanism, and which results in quick braking whereby rear-end collisions of vehicles from the rear occur. On the contrary, the present invention quantifies the probabilities (the existence confidences) that the obstructions detected by the range sensors are entities, and then uses the existence confidences and the precision of the classifier to figure out the classification belief assignments, and finally adds a mechanism merging and quantifying the obstruction classification confidence to correct the ineffective classification and to improve the precision of classification lest the system at a rear end do mistaken action. The range sensors such as radars or lidars are used to classify the obstructions without images. The present invention never loses protection abilities because of no images to greatly improve classification confidence and driving safety.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for quantifying classification confidence of obstructions applied to a perception mergence system of a vehicular computer in a vehicle, and said vehicular computer is connected with an image-retrieving unit, a vehicle body signal sensor and a plurality of range sensors, and said method for quantifying classification confidence of obstructions comprises steps of:

said vehicular computer receiving obstruction information of at least one obstruction, at least one piece of image information corresponding to said obstruction information and a plurality of vehicle body signals, and using a classifier to classify said obstruction information, said image information and said vehicle body signals;

said perception mergence system calculating a detection result of each said range sensor to calculate an existence confidence;

using said existence confidences and precision of said classifier to calculate a classification belief assignment of each said range sensor corresponding to each said obstruction;

performing mergence calculation on said classification belief assignments to respectively quantify an obstruction classification confidence of all said range sensors corresponding to each said obstruction; and performing a classification ineffectiveness filtering mechanism according to said obstruction classification confidence to exclude said obstruction whose said obstruction classification confidence less than a predetermined value.

2. The method for quantifying classification confidence of obstructions of claim 1, wherein each said range sensor tracks coordinates of said obstruction presently detected, compares with an actual value and a plurality of tracking values subsequently-received to determine a probability that tracked said obstruction presently exists whereby said probability is used as said existence confidence.

3. The method for quantifying classification confidence of obstructions of claim 2, wherein tracking and comparison of said obstruction and determination of said existence confidence are calculated using joint integrated probabilistic association (JIPDA).

4. The method for quantifying classification confidence of obstructions of claim 1, wherein said existence confidence is a probability that said obstruction detected by said range sensor is an entity.

5. The method for quantifying classification confidence of obstructions of claim 1, wherein said mergence calculation uses said classification belief assignments, precision of said range sensors and at least one obstruction continuous detection probability to calculate said obstruction classification reliability.

6. The method for quantifying classification confidence of obstructions of claim 5, wherein said obstruction continuous detection probability is a probability that said range sensors continuously detect identical said obstruction.

7. The method for quantifying classification confidence of obstructions of claim 5, wherein a determination way of said obstruction continuous detection probability comprises steps of:
receiving said obstruction information detected by said range sensor; and
comparing with preceding said obstruction information to determine whether said obstructions corresponding to said preceding said obstruction information and received said obstruction information are identical:
if no, determining that said obstruction is not a vehicle; and
if yes, determining whether identical said obstruction is continuously detected more than predetermined times:
if yes, determining said obstruction is a vehicle; and
if no, determining said obstruction is not a vehicle.

8. The method for quantifying classification confidence of obstructions of claim 6, wherein a determination way of said obstruction continuous detection probability comprises steps of:
receiving said obstruction information detected by said range sensor; and
comparing with preceding said obstruction information to determine whether said obstructions corresponding to said preceding said obstruction information and received said obstruction information are identical:
if no, determining that said obstruction is not a vehicle; and
if yes, determining whether identical said obstruction is continuously detected more than predetermined times:
if yes, determining said obstruction is a vehicle; and
if no, determining said obstruction is not a vehicle.

9. The method for quantifying classification confidence of obstructions of claim 5, wherein said precision of each said range sensor is predetermined value.

10. The method for quantifying classification confidence of obstructions of claim 1, wherein said classification ineffectiveness filtering mechanism comprises steps of:
retrieving said obstruction classification confidence of one said obstruction; and
determining whether retrieved said obstruction classification confidence is less than said predetermined value:
if yes, classifying said obstruction into misjudgment and filtering it out; and
if no, retrieving said obstruction classification confidence of another said obstruction for determining again.

11. The method for quantifying classification confidence of obstructions of claim 1, wherein in said classification ineffectiveness filtering mechanism, said vehicular computer informs a driver of said vehicle of said obstruction information of said obstruction in front of said driver in hearing, touch or vision ways when said obstruction classification confidence is larger than or equals to said predetermined value.

12. The method for quantifying classification confidence of obstructions of claim 11, wherein in said classification ineffectiveness filtering mechanism, said vehicular computer informs said driver of a probability of said obstruction being a vehicle or a pedestrian when said obstruction classification confidence is larger than or equals to said predetermined value.

13. The method for quantifying classification confidence of obstructions of claim 1, wherein said range sensors are radars or lidars (laser radars).

14. The method for quantifying classification confidence of obstructions of claim 5, wherein said mergence calculation comprises steps of:
choosing a specific obstruction from said at least one obstruction and introducing said classification belief assignments of said range sensors detecting said specific obstruction, said precision of said range sensors and said obstruction continuous detection probability;
calculating basic belief assignments of said range sensors according to existence or inexistence of said specific obstruction;
said specific obstruction having four detection situations comprising null, existence, inexistence, possible existence, and possible inexistence and using said basic belief assignments of said range sensors to calculate a mergence belief assignment according to said four detection situations; and
calculating an object existence probability of said specific obstruction according to said mergence belief assignment.

* * * * *